United States Patent [19]

Sridhar

[11] 4,412,968

[45] Nov. 1, 1983

[54] NUCLEAR REACTOR CONTROL APPARATUS

[75] Inventor: Bettadapur N. Sridhar, Cupertino, Calif.

[73] Assignee: The United States of America as represented by the U.S. Department of Energy, Washington, D.C.

[21] Appl. No.: 297,308

[22] Filed: Aug. 28, 1981

[51] Int. Cl.³ ............................................. G21C 7/08
[52] U.S. Cl. ..................................... 376/233; 376/238
[58] Field of Search ............... 376/228, 229, 233, 234, 376/238

[56] References Cited

U.S. PATENT DOCUMENTS

| | | | |
|---|---|---|---|
| 2,894,779 | 7/1959 | Kushner et al. | 376/233 |
| 3,448,006 | 6/1969 | Fortescue et al. | 376/233 |
| 3,715,269 | 2/1973 | Mehren | 376/233 |
| 3,762,994 | 10/1973 | Kunzel | 376/234 |
| 3,905,634 | 9/1975 | Johnson et al. | 376/233 |
| 3,941,413 | 3/1976 | Johnson et al. | 376/233 |
| 4,124,442 | 11/1978 | Zhuchkov et al. | 376/233 |
| 4,181,569 | 1/1980 | Ingham | 376/238 |

OTHER PUBLICATIONS

"Fast Reactor Technology: Plant Design", M.I.T. Press (1966), Yevick et al., pp. 626–627.

*Primary Examiner*—Sal Cangialosi
*Attorney, Agent, or Firm*—Edwin D. Grant; Stephen D. Hamel; Richard G. Besha

[57] ABSTRACT

Nuclear reactor core safety rod release apparatus comprises a control rod having a detent notch in the form of an annular peripheral recess at its upper end, a control rod support tube for raising and lowering the control rod under normal conditions, latches pivotally mounted on the control support tube with free ends thereof normally disposed in the recess in the control rod, and cam means for pivoting the latches out of the recess in the control rod when a scram condition occurs. One embodiment of the invention comprises an additional magnetically-operated latch for releasing the control rod under two different conditions, one involving seismic shock.

9 Claims, 4 Drawing Figures

NUCLEAR REACTOR CONTROL APPARATUS

BACKGROUND OF THE INVENTION

This invention resulted from a contract made by the United States Department of Energy and relates to a nuclear reactor control apparatus and, more particularly, to an apparatus for quickly releasing a shaft carrying a neutron-absorbing material that is inserted into a nuclear reactor core to control fission therein.

Complete shutdown of the operation of a nuclear reactor, commonly referred to as a scram, is required under any condition wherein continued operation could damage the reactor. A scram is generally effected by releasing a vertically disposed control rod carrying a neutron-absorbing material at its lower end, thus allowing the rod to drop to a level wherein it positions the absorber material within the reactor core and thereby stops fission therein. It is obviously important that components for releasably gripping such rods must have a high operational dependability. If a control rod release mechanism is operated by fluid pressure, it is also desirable to use a design that operates in a fail-safe mode by releasing the control rod in the event of loss of pressure.

The inertia of long safety rods limits the speed at which the control rods can be moved to scram position. Furthermore, it is possible that seismic shocks can interfere with the release of absorber carrying rods by bending them so that they cannot slide in their bearings. All scram control mechanisms must, of course, provide a means for returning safety rods to their raised position when an adverse operating condition has been eliminated.

As shown in the description of scram mechanisms presented in the text titled "Fast Reactor Technology: Plant Design", published by M.I.T. Press in 1966, electromagnets have previously been used to hold reactor safety rods in a raised position until an unsafe reactor operating condition occurs, at which time the electromagnets are deenergized to release the rods. An electromagnet is incorporated in a latch mechanism of one embodiment of the invention disclosed herein, but the construction of safety rod release apparatus in accordance with the invention differs from that of known devices. Furthermore, known safety rod release devices use only one release means, whereas in a preferred embodiment of this invention a plurality of release latches provide for two types of scram.

SUMMARY OF THE INVENTION

It is an object of this invention to provide an improved means for rapidly inserting a neutron absorber into a nuclear reactor core to control fission therein.

Another object of this invention is to provide a dependable latch means for releasably holding a nuclear reaction control rod in an inoperative position. This latch, which is pivotal in nature, can be used independently as a single release mechanism or in combination with other types of latch mechanisms.

A third object of this invention is to provide a nuclear control apparatus having a reliable absorber release latch carried by a lead screw drive means for moving the absorber into and out of the core.

These objects and other advantages are attained by a first preferred embodiment of the invention comprising: a tube attached to and depending from a vertically movable carriage; a vertically disposed control rod carrying a neutron absorbor at its lower end and having a detent notch at its upper end, the control rod being movable between a raised position wherein its upper end is held within the lower end of said tube and the absorber is above a nuclear reactor core and a lowered position wherein its upper end is released from the tube and the absorber is within the core; two latches mounted inside the lower end of the tube for pivotal movement about vertical axes between a first position wherein free ends thereof are disposed in the detent notch in the control rod and a second position wherein the free ends are displaced from the detent notch; and a fluid-actuated piston-cylinder ram comprising a housing mounted in the carriage, a piston disposed within the housing, an actuator shaft connected in the piston and extending from the housing to the lower end of the tube, and a spring disposed within the housing above the piston for moving the latter and the actuator shaft downwardly when fluid is released from the housing; and two fingers attached to the lower end of the actuator shaft and depending therefrom, each of the fingers including a cam surface disposed oblique to the longitudinal axis of the tube and engageable with a respective one of the latches to displace it from the detent notch in the control and when the actuator shaft is moved to its lowered position.

A second preferred embodiment of this invention comprises: (1) an upper electromagnet-actuated collet finger-type latch for releasing the entire safety rod during normal scrams and (2) a lower pivotal latch means of the type described in the previous paragraph for releasing a small segment of the safety rod during a seismic scram. The entire safety rod is released when a condition occurs that cannot affect the lowering of the rod, such as, for example, the failure of a coolant pump. However, when a condition occurs that may effect the movement of the entire safety rod (such as an earthquake), the absorber-holding segment is released from the lower end of the safety rod by the pivotal latch means and allowed to move within the reactor core. The long safety rod could be bent by seismic shock and thus jammed in a position wherein the neutron absorber is held outside the reactor core. The small absorber-holding segment of the rod will not be affected by seismic shock and, in addition, it can be moved more rapidly within the reactor core than the entire safety rod because its inertia is much less than that of the rod.

DESCRIPTION OF THE PREFERRED EMBODIMENT

Figure 1:
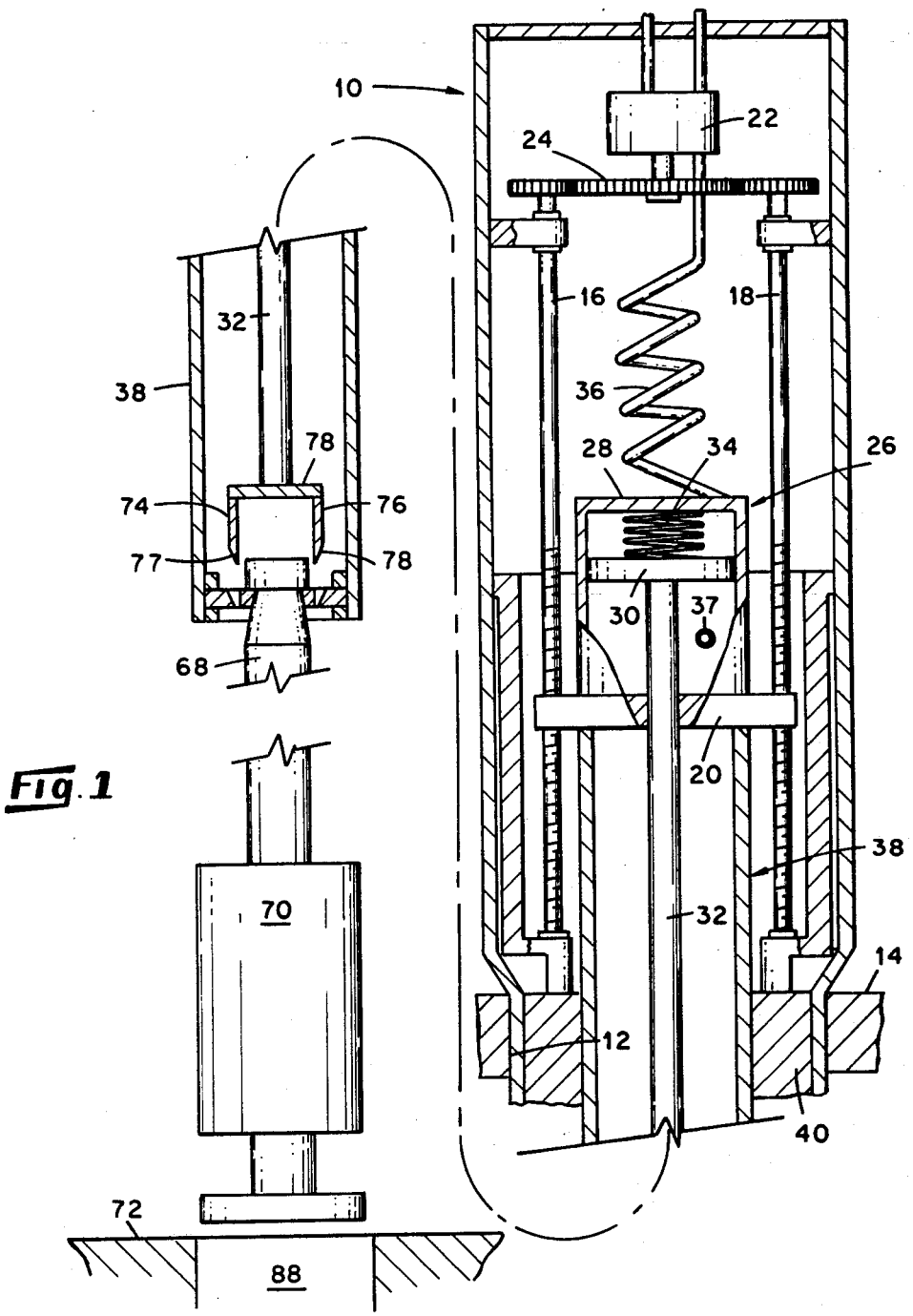
FIG. 1 is a schematic representation of a first preferred embodiment of the invention, wherein certain components are segmented or broken away for clarity.

In FIG. 1, reference number 10 generally designates a cover that extends through an aperture 12 in the top plate 14 of the containment vessel of a nuclear reactor, this cover projecting upwardly from the top plate and having mounted therein a pair of vertically disposed lead screws 16, 18 that are respectively threadedly engaged in apertures in a carriage 20 and connected to an electric motor 22 by gearing 24. Reference number 26 generally designates a piston-cylinder-type ram comprising a housing 28 which is mounted on carriage 20 and a piston 30 which is connected to a vertically extending actuator shaft 32 slidably fitted in a central aperture in the carriage. A coil-type spring 34 is located between piston 30 and the top cover of housing 28, and an extensible conduit 36 connects a source of pressurized fluid with the space in the housing below the piston through an inlet 37 in the side of the housing.

Figure 2:
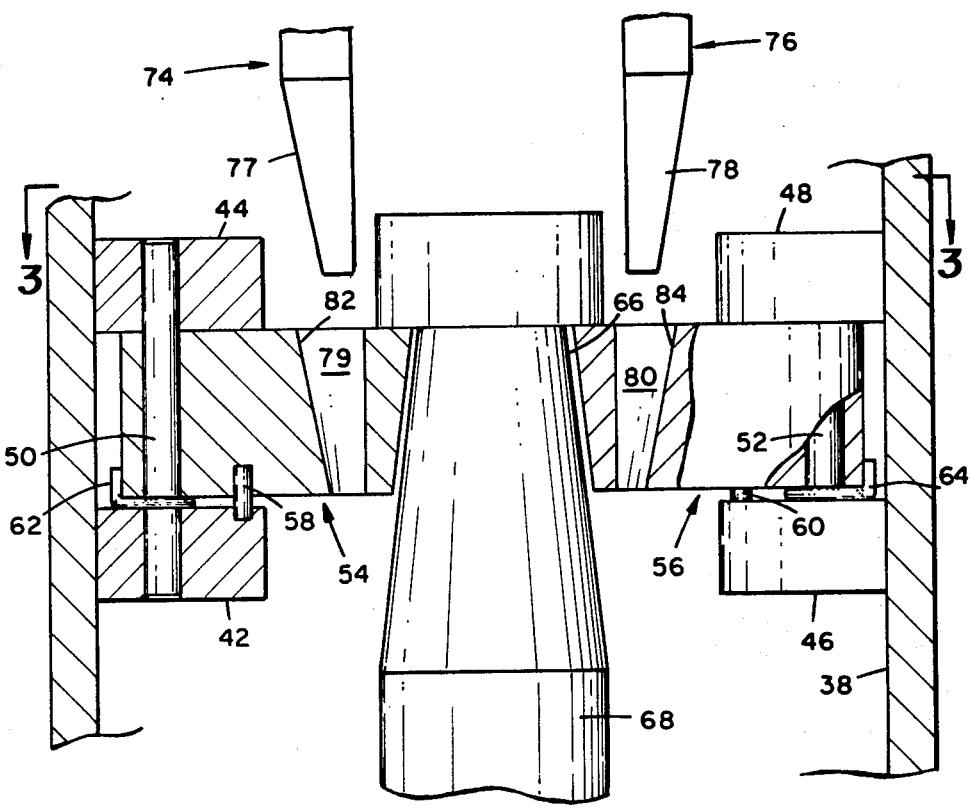
FIG. 2 is a detail view of latch components of the preferred embodiment, certain of these components being broken away for clarity.

Concentrically disposed around actuator shaft 32 is a control rod support tube 38 the upper end of which is fixedly secured to carriage 20. Control rod support tube 38 is slidably positioned in a central aperture in a seal plug 40 fitted in the portion of cover 10 fixed within aperture 14 of top plate 14 and, as can best be seen in FIG. 2, the tube has four support lugs 42–48 integrally attached to its inner surface at its lower end. More particularly, support lugs 42–48 project radially from the inner surface of control rod support tube 38 and two of the lugs (42, 44) are axially spaced apart in vertical alignment on one side of the tube and the other two lugs (46, 48) are axially spaced apart in vertical alignment on the opposite side of the casing. Opposite ends of a support pin 50, 52 are respectively disposed in apertures in each associated pair of the support lugs, the longitudinal axis of each support pin being parallel with the longitudinal axis of control rod support tube 38. Two arcuate latches generally designated by reference numbers 54, 56 are respectively pivotally mounted on support pins 50, 52 and are resiliently biased by torsion springs 62, 64 toward stop pins 58, 60 respectively attached to support lugs 42, 46. In FIG. 2, latch 54 is illustrated in cross section and latch 56 is illustrated partially in cross section so that an aperture 79, 80 formed in each latch can be shown.

In the configuration of components that is illustrated in FIG. 1, the free ends of latches 54, 56 are positioned in a detent notch 66 that extends around the outer side surface of a vertically disposed control rod 68 at the upper end thereof. At the lower end of control rod 68 is an assembly 70 containing material that captures neutrons when it is inserted in a nuclear reactor core 72, this assembly being referred to hereinafter as the absorber.

As illustrated in FIG. 1, two fingers respectively generally designated by reference numbers 74, 76 depend from diametrically opposed points on the perimeter of a disk 78 secured to the lower end of actuator shaft 32. Each finger 74, 76 includes at its lower end a side cam surface 77, 78 that confronts the inner surface of tube 38 and is disposed oblique thereto. An aperture 79, 80 extends through each of the latches 54, 56 and a cam surface 82, 84 is formed on the side of this aperture that is adjacent control rod support tube 38, this cam surface being disposed at the same angle relative to the longitudinal axis of the tube as the cam surfaces on fingers 74, 76.

Figure 4:
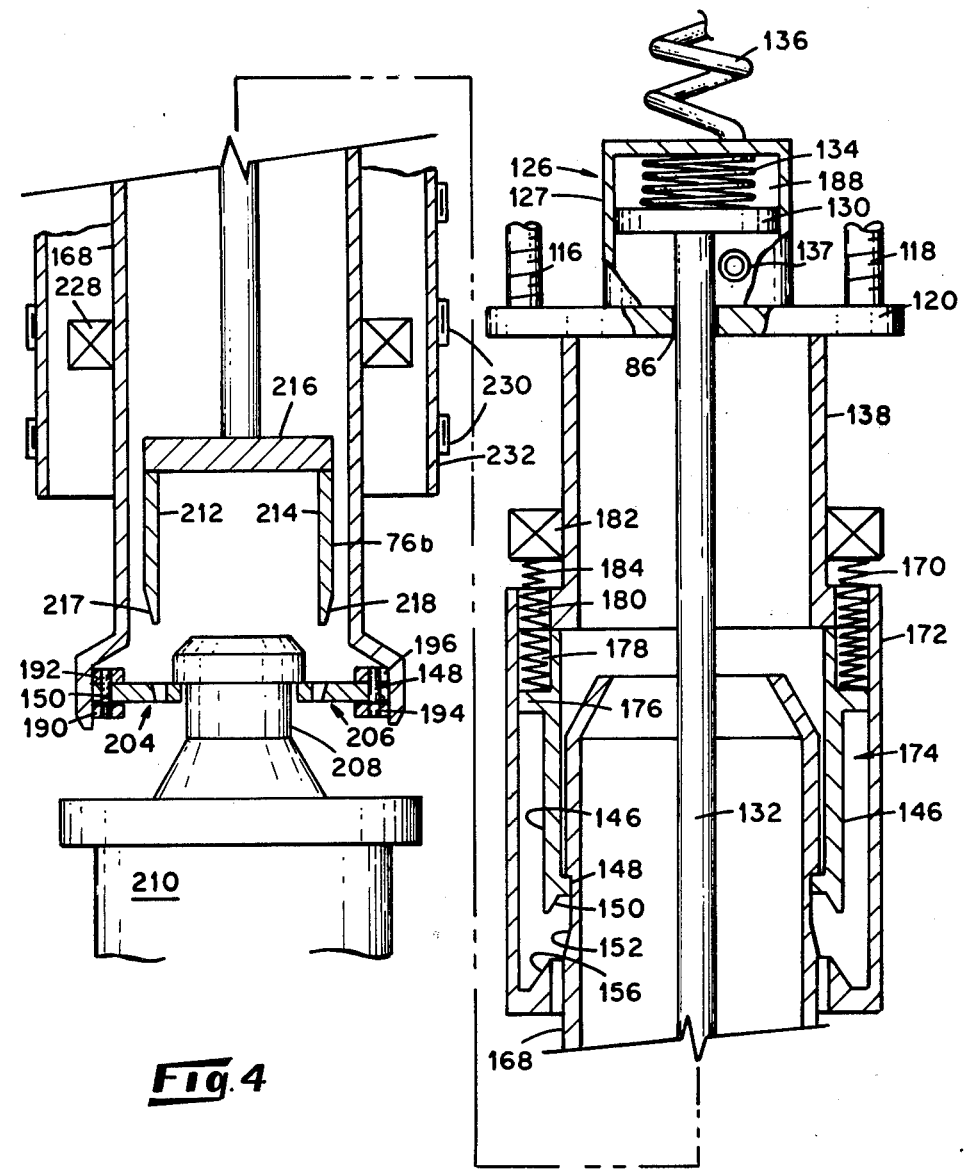
FIG. 4 is a schematic representation of a second preferred embodiment of the invention having different, separately operable latch mechanisms, certain components being segmented and broken away in this drawing for clarity and other components which are identical to parts shown in FIG. 1 being omitted.

A second embodiment of the invention that is illustrated in FIG. 4 includes a vertically disposed tubular drive shaft 138 connected at its upper end to a carriage 120 of the type designated by reference number 20 in FIG. 1, the carriage being mounted on lead screws 116, 118 connected to a motor as shown in the last-mentioned drawing. A flange 170 projects outwardly from the lower end of drive shaft 138, and a sleeve 172 extends downwardly from the periphery of this flange. Reference number 174 generally designates a first latch comprising a ring 176 the outer side surface of which slidably engages the inner surface of sleeve 172 and the top surface of which abuts the lower surface of the flange 170 on drive shaft 138 in the illustrated arrangement of the components. Holes 178 are evenly spaced around the upper surface of ring 176, these holes extending only partially through the ring and being respectively aligned with apertures 180 that extend through flange 170 on drive shaft 138. A solenoid 182 is mounted around drive shaft 138 adjacent flange 170, and coil-type springs 184 are respectively positioned in holes 178 in ring 176 and apertures 180 in flange 170 with their lower ends engaged with the bottom surfaces of holes 178 and their upper ends engaged with the lower surface of the solenoid.

Attached to ring 176 of latch 174 are fingers 146 having detent elements 148 and first cam elements 150 formed thereon. A vertically disposed control rod support tube 168 is provided with a recess 152 at its upper end, and in FIG. 4, detent elements 148 on fingers 146 are positioned in this recess. Integrally formed on the lower end of sleeve 172 is a second annular cam element 156.

Mounted on the carriage 120 is a ram generally designated by reference number 126. The wall of carriage 120 and the wall of the housing 127 of ram 126 from a chamber 188 in which a piston 130 is slidably disposed, and an actuator shaft 132 is connected to the piston and slidably engaged in an aperture in the wall of carriage 120. Piston 130 and shaft 132 are biased downwardly by a coil-type spring 134 held between the piston and the end wall of ram 120. A conduit 136 connects a source of pressurized fluid with the space in chamber 188 below piston 130 through an inlet 137. Control rod support tube 168 has four support lugs 190–196 integrally attached to its inner wall at its lower end. More particularly, the support lugs project radially from the inner wall of tube 168, and two of the lugs (190, 192) are axially spaced apart in vertical alignment on one side of the tube and the other two lugs (194, 196) are axially spaced apart in vertical alignment on the opposite side of the tube. Opposite ends of support pins corresponding to pins 50 and 52 of FIG. 1 are respectively disposed in apertures in each associated pair of the support lugs, the longitudinal axis of each support pin being parallel with the longitudinal axis of control rod support tube 168. Two arcuate latches generally designated by reference numbers 204, 206 are respectively pivotally mounted on support pins and resiliently biased toward stop pins respectively attached to support lugs 190, 194 by torsion springs in the same arrangement illustrated in FIG. 2.

In the configuration of components that is illustrated in FIG. 4, free ends of latches 204, 206 are positioned in a detent notch 208 that extends around the outer side surface of a vertically disposed control rod 210 at the upper end thereof. At the lower end of control rod 210 is an assembly (not shown) containing material that captures neutrons when it is inserted in a nuclear reactor core, this assembly being referred to hereinafter as the absorber.

As also illustrated in FIG. 4, two fingers generally designated by reference numbers 212, 214 depend from diametrically opposed points on the perimeter of a disk 216 secured to the lower end of actuator shaft 132. Each finger 212, 214 includes at its lower end a side cam surface 217, 218 that confronts the inner surface of control rod support tube 168 and is disposed oblique thereto. Cam surfaces are also respectively formed on the sides of apertures respectively formed in latches 204, 206 in the same arrangement as illustrated in FIG. 2, these cam surfaces being disposed at the same angle relative to the longitudinal axis of control rod support tube 168 as the cam surfaces on fingers 212, 214. A permanent magnet 228 mounted on control rod support tube 168 tracks the safety rod by actuating reed switches 230 mounted on a tube 232 located outside the shaft. This position detection is possible only during scrams when the entire safety rod translates.

OPERATION OF THE PREFERRED EMBODIMENTS

Figure 3:
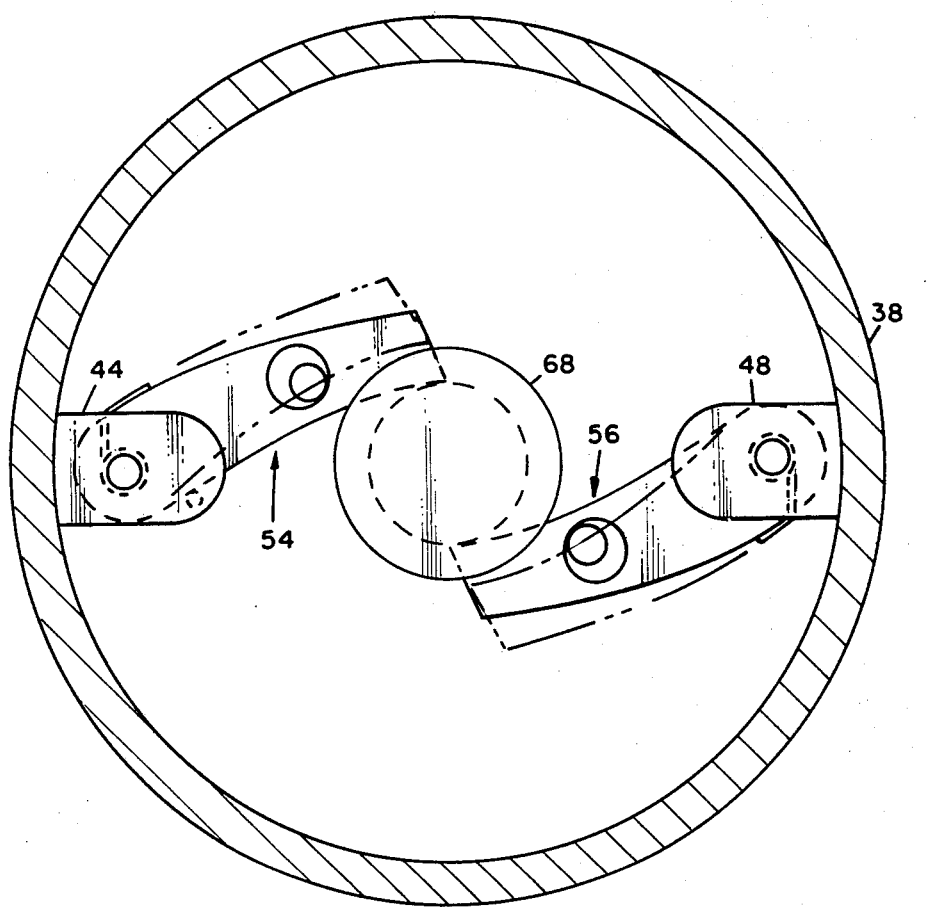
FIG. 3 is a plan view of the components illustrated in FIG. 2, taken along the plane represented by line 3—3 in the latter drawing and in the direction indicated by arrows associated with that line.

When control rod support tube 38 and control rod 68 are positioned as illustrated in FIG. 1, the neutron absorber 70 on the end of the control rod is held above the nuclear reactor core 72. If a condition develops that requires shutdown of the reactor, pressurizing fluid in housing 28 below piston 30 is released through conduit 36. Spring 34 then forces piston 30 and actuator shaft 32 connected thereto downwardly, which causes cam surfaces 77, 78 on fingers 74, 76 to engage cam surfaces 82, 84 on latches 54, 56 and thereby pivots the latches from the position illustrated by solid lines in FIG. 3 to the position illustrated by broken lines in the same drawing. Control rod 68 is thus released and drops to a position wherein absorber 70 is disposed within the aperture 88 in core 72, thereby stopping fission in the core.

Retrieval of absorber 70 from its lowered position is effected by operating motor 22 to rotate lead screws 16, 18 in the direction which lowers carriage 20 and control rod support tube 38 mounted thereon to a position where the lower end of the tube is disposed around the upper end of control rod 68 and latches 74, 76 are aligned with detent notch 66 in the control rod. Fluid is then forced into housing 28 below piston 30 to drive the piston inwardly in the housing. This movement of piston 30 lifts actuator rod 32 and fingers 74, 78 connected thereto upwardly, and springs 62, 64 pivot the free ends of latches 54, 56 into detent notch 66 in control rod 68. Lead screws 16, 18 are then rotated by motor 22 in the direction which raises control rod support tube 38 and control rod 68 to the position illustrated in FIG. 1.

The apparatus illustrated in FIG. 4 provides for insertion of the absorber mounted on control rod 210 into a reactor core under two different conditions. During normal operation of the reactor with which the apparatus is associated, electric current flows through solenoid 182 and the magnetic field of the solenoid holds the upper surface of ring 176 of latch 174 against the flange 170 at the lower end of drive shaft 138 so that control rod support tube 168 and the absorber on control rod 210 are held in raised position. If a non-seismic event occurs that requires insertion of the absorber into the reactor core, flow of electric current through solenoid 182 is terminated. Latch 174 is then pulled downwardly by the weight of control rod support tube 168 and the absorber on control rod 210, and when cam elements 150 of the latch engage cam element 156 on sleeve 172 and are cammed away from control rod support tube 168 by said element, the control rod support tube and absorber are released from the latch. However, if a seismic event occurs, it is advantageous, for the reasons presented hereinbefore, to release the absorber from control rod support tube 168. This can be accomplished by releasing pressurizing fluid from chamber 188 below piston 130 in the housing 127 of ram 126, whereupon spring 13A forces the piston and actuator shaft 132 downwardly. Fingers 212, 214 on actuator shaft 132 disengage latches 204, 206 from the notch in the upper end of control rod 210, and the control rod is thus released.

When control rod support tube 168 has been released, the tube and the absorber on control rod 210 are retrieved from their lowered position by operating the motor attached to lead screws 116, 118 to rotate the latter in the direction which lower carriage 120 and drive shaft 138 mounted thereon to a position where the sleeve 172 on the lower end of the drive shaft is disposed around the upper end of control rod support tube 168 and cam element 156 is positioned relative to recess 152 in the tube as illustrated in FIG. 4. Springs 184 hold cam element 150 against cam element 156 while drive shaft 138 is being lowered. The upper end of ring 176 is then lifted against flange 170 on the lower end of drive shaft 138 by passing electric current through solenoid 182, which enables detent elements 148 on fingers 146 to move into recess 152 on drive shaft 168. Lead screws 116, 118 are then rotated by their drive motor in the direction which raises drive shaft 138 and control rod support tube 168 to the position thereof that is illustrated in FIG. 4.

When control rod 210 has been released from control rod support tube 168 to shut down the reactor during a seismic disturbance, carriage 120 is lowered to bring the latches 204, 206 (still held in disengaged position by fingers 212, 214) in line with the notch 208 on the control rod. Then pressurizing fluid is forced into chamber 188 below piston 130 to lift fingers 212, 214, thus moving the cam surfaces on the lower ends of the fingers away from the cam surfaces on latches 204, 206. Latches 204, 206 then pivot into notch 208 on control rod 210, and the latter can then be raised by rotating lead screws 116, 118.

What is claimed is:

1. Apparatus for controlling fission in a nuclear reactor core, comprising:
   a vertically movable carriage;
   a vertically disposed control rod support tube carried by and positioned under said carriage;
   a vertically disposed control rod carrying a neutron absorber at its lower end and having a detent notch at its upper end, said control rod being mounted for reciprocation along its longitudinal axis between (1) a raised position wherein its detent notch is positioned at the lower end of said control rod support tube and said absorber is above said core, and (2) a lowered position wherein said absorber is positioned within said core;
   a latch mounted on the lower end of said control rod support tube for pivotal movement between (1) a first position wherein a portion of said latch is disposed in the detent notch in said control rod, and (2) a second position wherein said latch portion is displaced from said detent notch;

an actuator shaft supported by said carriage and extending through said control rod support tube to the lower end thereof, said actuator shaft having a cam means at its lower end and being mounted for reciprocation along its longitudinal axis between (1) a raised position relative to said control rod support tube wherein it permits said latch to remain in said first position thereof, and (2) a lowered position relative to said control rod support tube wherein said cam means displaces said latch to said second position thereof; and means mounted on said carriage for moving said actuator shaft between said raised and lowered positions.

2. The apparatus of claim 1 wherein said latch is mounted for pivotal movement about a vertical axis.

3. The apparatus of claim 2 wherein said latch is mounted on the inner surface of said control rod support tube.

4. The apparatus of claim 3 including means carried by said control rod support tube for resiliently biasing said latch toward said first position thereof.

5. The apparatus of claim 4 wherein said means for moving said actuator shaft comprises a fluid-actuated ram including a housing mounted on said carriage, a piston disposed within said housing and connected to the upper end of said actuator shaft, and a spring disposed within said housing above said piston for moving said piston and actuator shaft downwardly when fluid is released from said housing.

6. The apparatus of claim 5 including (1) a plurality of latches spaced apart from one another around said control rod support tube and having free ends positioned in the detent notch in said control rod when the control rod is in its raised position, and (2) a plurality of fingers attached to lower end of said actuator shaft and depending therefrom, each of said fingers including a cam surface engageable with respective one of said latches to displace its free end from said detent notch when said actuator shaft is moved to its lowered position.

7. The apparatus of claim 1 wherein said control rod support tube has a recess in its outer side surface and including:

a vertically disposed tubular drive shaft attached to and depending from said carriage;

a latch disposed adjacent the outer side surface of said control rod support tube and movable between a raised tube holding position and a lowered tube releasing position, said latch comprising (1) a detent element movable toward and away from said control rod support tube and positioned in the recess therein when said latch is in its raised tube holding position to thereby prevent movement of said control rod support tube to its lowered position, and (2) a first cam element projecting below said detent element;

a second cam element spaced below said tube latch when the latter is in its raised tube holding position, said second cam element being arranged so that when said latch moves to its lowered tube releasing position, it engages said first cam element and moves said detent element out of the recess in said tube, whereby said control rod support tube is permitted to drop;

magnetic means for releasably holding said tube in its raised tube holding position; and spring means carried by said drive shaft for forcing said latch toward said second cam element when the latter is released from its raised tube holding position.

8. The apparatus of claim 7 wherein said magnetic means comprises a solenoid mounted on said drive shaft.

9. The apparatus of claim 8 wherein said latch comprises (1) a ring disposed around said control rod support tube, and (2) an elongate, flexible element depending from said ring and supporting said detent element and said first cam element at its lower end.

* * * * *